(12) United States Patent
Chattin

(10) Patent No.: US 7,128,672 B2
(45) Date of Patent: Oct. 31, 2006

(54) CLUSTER SPROCKETS FOR BICYCLE TRANSMISSIONS AND OTHER PRIME MOVERS

(75) Inventor: Jesse R. Chattin, Tampa, FL (US)

(73) Assignee: Chalin Cluster Corporation, Brandon, FL (US)

( * ) Notice: Subject to any disclaimer, the term of this patent is extended or adjusted under 35 U.S.C. 154(b) by 110 days.

(21) Appl. No.: 10/414,763

(22) Filed: Apr. 16, 2003

(65) Prior Publication Data

US 2004/0209721 A1    Oct. 21, 2004

(51) Int. Cl.
F16H 55/12    (2006.01)

(52) U.S. Cl. .................................... 474/141; 474/160

(58) Field of Classification Search ............... 474/141, 474/152, 153, 156, 160; 74/434, 437
See application file for complete search history.

(56) References Cited

U.S. PATENT DOCUMENTS

| | | | |
|---|---|---|---|
| 59,064 A | * | 10/1866 | Potter ............................ 74/434 |
| 591,488 A | * | 10/1897 | McMullin ....................... 474/81 |
| 3,956,943 A | * | 5/1976 | Yamasaki ....................... 474/148 |
| 6,293,884 B1 | * | 9/2001 | Chattin .......................... 474/160 |

* cited by examiner

Primary Examiner—Vicky A. Johnson
(74) Attorney, Agent, or Firm—Akerman & Senterfitt; Stephen A. Pendorf

(57) ABSTRACT

This invention concerns a sprocket gear for facilitating the derailing of the chain of a bicycle transmission and other prime movers. The sprocket gear includes at least two sprockets axially and concentrically positioned relative to one another. Each sprocket includes a perimeter, a front face, and a back face. Gear teeth project axially from at least a first perimeter segment of the front face and at least a second perimeter segment of the front face is free of gear teeth. Gear teeth project axially from the back face perimeter at the at least second segment of the front face. No gear teeth project from the back face perimeter at the at least first perimeter segment of the front face.

16 Claims, 1 Drawing Sheet

CLUSTER SPROCKETS FOR BICYCLE TRANSMISSIONS AND OTHER PRIME MOVERS

BACKGROUND OF THE INVENTION

1. Field of the Invention

The present invention relates generally to a bicycle transmission mechanism, and more particularly, to a multi-speed transmission employing a sprocket gear of the bicycle transmission mechanism that facilitates movement of the chain from one sprocket to an adjacent sprocket during derailing.

2. Description of the Background Art

The bicycle gear-shifting mechanism is generally composed of two sprocket sets and a sprocket chain interconnecting the two sprocket sets for transferring motion from one sprocket to another. The sprocket sets are provided respectively with gears having various numbers of teeth. The gear-changing process of the bicycle is attained by an action of pulling the transmission cable so as to actuate the sprocket chain to move from one sprocket to another.

A derailleur mechanism allows a rider to selectively move the chain to a different one of the sprockets in each set of sprockets. This enables the rider to select a gear ratio that is most appropriate for the current riding conditions.

There have been many attempts to improve upon the derailing of the chain from one sprocket to an adjacent sprocket. Presently, there exist many types of transmissions that employ a sprocket gear and a derailer gear for selectively moving a chain from one sprocket to another adjacent sprocket so as to change the speed of the bicycle.

Basically, derailers function to exert a force on the chain in a location proximate to the sprocket gear so as to force the chain into alignment with the adjacent sprocket. During derailing from one sprocket to another sprocket, the chain is forcibly urged off the teeth of the one sprocket and onto the teeth of the adjacent sprocket. Upon a full revolution, the chain is thus fully derailed from the one sprocket and is fully engaged around the adjacent sprocket, thereby completing the derailing to the adjacent sprocket.

Sprocket gear and derailers have been universally accepted throughout the bicycle industry. However, it has also been widely known that the chain may slip during derailing should the teeth of the adjacent sprocket not fully engage the chain as the chain is forcibly moved off the one sprocket onto the adjacent sprocket. Slippage during shifting is highly undesirable as it causes the bicyclist to lose cadence. Moreover, chain slippage during a power stroke may cause the bicyclist to lose control of the bicycle and may even result in an accident.

A disadvantage of currently available derailleur systems is that they do not always shift smoothly under load, for example, when a rider is riding a bicycle up a hill. A further disadvantage of some derailleur type multi-speed transmissions is that a significant amount of force is generally required to shift the chain between adjacent sprockets in one of the sets of sprockets. Therefore, if it is desired to automate the shifting function by controlling shifting with a computer-controlled actuator; for example, the actuator must be capable of supplying the necessary force. Consequently, an expensive and typically power hungry actuator is required. The result is that electronically controlled automatic derailleur type transmissions have not been widely accepted.

A major problem of the prior art is that the conventional variable speed bicycle uses the conventional sprocket of the single speed bicycle, without taking into consideration the design of the chain shifting process. In other words, when the gear changing is under way, the sprocket chain engages the other sprocket in a random manner. As a result, the chance of success of gear changing of the conventional variable speed bicycle is relatively low. In the meantime, the speed changing process is slow while the operation feel is less smooth. In view of these drawbacks, various improvements in the sprocket structure of the variable speed bicycle have been made in recent years in the hope that the engagement of the sprocket chain and the sprocket takes place successfully with precision when the bicycle gear changing is under way.

U.S. Pat. No. 5,192,248 entitled "Multi-stage Sprocket Gear for Bicycle" to Nagano discloses an invention making use of the reduction in the engaging tooth height of the deformed tooth or the affixed tooth. The fixed-point gear changing is attained by means of the relay engagement of the intermediate teeth. However, this design is costly, and the split tooth also weakens tooth strength and has negative impact on safety.

U.S. Pat. No. 5,413,534 entitled "Chain Shift Aiding Structure for Bicycle Sprocket" to Nagano discloses a gear changing path which is provided with a support projection for bracing the waist of the sprocket chain at the time when the gear changing takes place, thereby averting the chain shifting failure which is brought about by the fall of the sprocket chain before the chain has arrived at the engaging teeth.

U.S. Pat. No. 5,085,621 entitled "Multi-stage Sprocket Gear for Bicycle" to Nagano discloses a sprocket having the design of the slanted pocket of recess for averting the sprocket changing outer chain plate and for bracing the waist portion of the sprocket chain, so as to enhance the chance of success of gear changing.

The prior art also teaches the use of transmissions including a "variable diameter sprocket." For example, U.S. Pat. No. 4,634,406 entitled "Multiple Speed Transmission for Bicycles" to Hufschmid, discloses a transmission, in which one of the front and rear groups of sprockets is replaced with a segmented sprocket. The segmented sprocket has a number of radially movable segments that engage the chain. By moving the segments inwardly or outwardly, the effective diameter of the segmented sprocket can be changed, thereby varying the gear ratio of the transmission.

Unfortunately, this transmission has not been commercially acceptable, because it is complicated, too heavy, inefficient, and is not well suited to automation with low powered actuators.

In addition, the prior art teaches various types of gear-tooth configurations and placements to facilitate derailing of the chain from one sprocket to an adjacent sprocket. As can be seen in such patents, tooth configuration has heretofore been optimized to allow the chain to twist axially sideways so as to more easily be derailed from one sprocket to an adjacent sprocket. The positions of the teeth on the sprockets are likewise optimized to facilitate derailing. For example, a "missing" tooth configuration has been known to facilitate derailing as the "missing" tooth space more easily allows the chain to be grasped by the tooth of an adjacent sprocket without slippage. U.S. Pat. No. 4,348,200 entitled "Multi-speed Sprocket Gear for a Bicycle" to Terada discloses a "missing" tooth configuration wherein a reduced radius, or recess, is provided at the point of the "missing" tooth. A tooth is positioned in the reduced radius, or recess, to facilitate shifting of the gear of the chain from one sprocket to an adjacent sprocket by means of the tooth positioned in such recess.

U.S. Pat. No. 5,192,249 entitled "Multi-step Bicycle Transmission Sprocket Gear" to Mu discloses multi-step transmission sprocket gear and includes a large sprocket gear, an intermediate sprocket gear, and a small sprocket gear. The intermediate sprocket gear is provided in the top surface of a predetermined tooth with a first recess and is further provided with a chain-guiding recess located in the back side of a plurality of adjoining teeth along the reverse revolving direction of the predetermined tooth. The large sprocket gear is provided in the top surface of a predetermined number of teeth thereof with a second recess corresponding in location to the chain-guiding recess of the intermediate sprocket gear in the reverse revolving direction. The sprocket chain is capable of shifting from the small sprocket gear to the intermediate sprocket gear with speed, thanks to the first recess and the chain-guiding recess of the intermediate sprocket gear. The second recess of the large sprocket gear serves to avert the deflection of the sprocket chain so as to eliminate the mechanical interference of the large sprocket gear by the sprocket chain when a transmission process is in progress.

A disadvantage presented by the MU patent is that the chain is not always engaged to the teeth, the recesses do not overlap, thus a slip of the chain can occur.

Finally, U.S. Pat. No. 6,293,884 entitled "Cluster Sprocket for Bicycle Transmissions and Other Prime Movers" to the present inventor, the disclosure of which is hereby incorporated by reference, discloses a multi-sprocket gear including a plurality of progressively-sized sprockets that are positioned adjacent to one another to define an increasing diameter sprocket gear.

A disadvantage presented by the Chattin patent is that the cluster system does not provide a smooth derailing of the chain from one sprocket to an adjacent sprocket.

While the foregoing sprocket gears noted above have been recognized in the industry as providing some solutions to the problem of slippage during derailing, there is nevertheless a substantial need in the derailer industry for cluster sprockets having configurations that optimize the derailing of the chain from one sprocket to an adjacent sprocket.

What is needed is a reasonably simple variable ratio cluster sprocket—which is reasonably light in weight, yet reasonably robust, reasonably inexpensive to fabricate and readily shifted from one ratio to another.

SUMMARY OF THE INVENTION

It is an object of the present invention to provide a sprocket gear having configurations that optimize the derailing of the chain from one sprocket to an adjacent sprocket.

It is yet another object of the present invention to provide a sprocket gear that facilitates derailing of a chain from one sprocket to an adjacent sprocket without slippage.

It is yet another object of the present invention to provide a sprocket gear that is reasonably light in weight, reasonably inexpensive to fabricate, and at the same time, facilitates the derailing of a chain from one sprocket to an adjacent sprocket.

It is yet another object of the present invention to provide a sprocket gear, including a shifting aid which facilitates shifting the chain from the larger to the smaller sprocket wheel, and when shifting from the smaller to the larger sprocket wheel under load.

It is yet another object of the present invention to provide a sprocket gear wherein the shift from one sprocket to another is performed smoothly, safely, and quietly, and to guarantee that the chain engages with the newly-selected sprocket as quickly as possible.

It is yet another object of the present invention to provide a sprocket gear for bicycles and other prime movers wherein the individual sprockets are non-circular in configuration and aligned with adjacent sprockets such that at least one long radius of one sprocket is substantially equal in length and aligned with at least one radius of an adjacent sprocket, whereby there exists a point in which the ratio of the adjacent sprockets are substantially equal.

It is yet another object of the present invention to provide a sprocket gear that can be incorporated into existing bicycles without requiring substantial modifications.

The present invention concerns a sprocket comprising:
a perimeter,
a front face, and
a back face,
wherein gear teeth project axially from at least a first perimeter segment of said front face and wherein at least a second perimeter segment of said front face is free of gear teeth;
wherein gear teeth project axially from said back face perimeter at the at least first segment of the front face, and wherein no gear teeth project from the back face perimeter at the at least second perimeter segment of the front face.

The sprocket according to the present invention has a thickness equal to two times a thickness of the gear teeth. The thickness of the sprocket is between 2 to 2.5 mm.

Further, the sprocket according to the present invention comprises four chain-guiding recesses, equally spaced apart on the sprocket. The chain-guiding recesses are alternatively positioned between the front face and back face of the sprocket.

The chain-guiding recesses of the front face of the sprocket are located at the second perimeter segment of the front face and wherein the chain-guiding recesses of the back face of the sprocket are located at the first perimeter segment of the front face.

The chain-guiding recess in the at least long radius of the sprocket are located in the same face of the sprocket, wherein the chain-guiding recess in the at least short radius of the sprocket are located in the same face of the sprocket.

In the first preferred embodiment of the present invention, the sprocket has a non-circular configuration and has at least one long radius and at least one short radius.

In the second preferred embodiment of the present invention, the sprocket has a circular configuration.

Further, the present invention comprises a sprocket gear having in combination:
at least two sprockets axially and concentrically positioned relative to one another;
said sprockets comprising a non-circular configuration having at least one long radius and at least one short radius; and
wherein the sprockets being axially aligned adjacent to one another such that said short radius of one said sprocket is axially substantially aligned with and substantially equal in length with said long radius of an adjacent sprocket;
wherein each sprocket comprises:
a perimeter,
a front face, and
a back face,
wherein gear teeth project axially from at least a first perimeter segment of said front face and wherein at least a second perimeter segment of said front face is free of gear teeth;

wherein gear teeth project axially from said back face perimeter at the at least first segment of the front face, and wherein no gear teeth project from the back face perimeter at the at least second perimeter segment of the front face.

The chain-guiding recess of adjacent sprockets overlap in order to always keep the chain engaged to the system.

The at least two sprockets are axially positioned on a wheel axis X so that the chain-guiding recess of the long radius of the sprockets is retarded 90° relative to the chain-guiding recess of the long radius of adjacent sprockets.

Further, the at least two sprockets are on a wheel axis X so that the chain-guiding recess of the back face of one sprocket is facing the chain-guiding recess of the front face of the adjacent sprocket, and the no chain-guiding recess portion of the back face is facing the non chain-guiding recess portion of the front face of the adjacent sprocket.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be given to the following detailed descriptions taken in connection with the accompanying drawings in which.

Similar reference characters refer to similar parts throughout the several views of the drawings.

DETAILED DESCRIPTION OF THE INVENTION

The present invention represents a significant advance over the technology disclosed in U.S. Pat. No. 6,293,884 to the present inventor, the disclosure of which is incorporated in here by reference.

For the purpose of summarizing this invention, this invention comprises a multi-sprocket gear including a plurality of progressively-sized sprockets that are positioned adjacent to one another so as to define an increasing-diameter sprocket gear. For use in connection with a bicycle or other prime mover, a derailleur or other mechanism is provided to forcibly derail the chain riding on one sprocket to an adjacent sprocket. Upon derailing of the chain from the one sprocket, the chain is engaged by a tooth of an adjacent sprocket and then pulled through a rotational movement such that the chain is fully derailed from the one sprocket to an adjacent sprocket upon one complete revolution.

In the first preferred embodiment of the present invention, each sprocket of the cluster sprocket gear comprises a non-circular configuration having at least one long radius and at least one short radius (e.g., eccentric oval).

Figure 2:
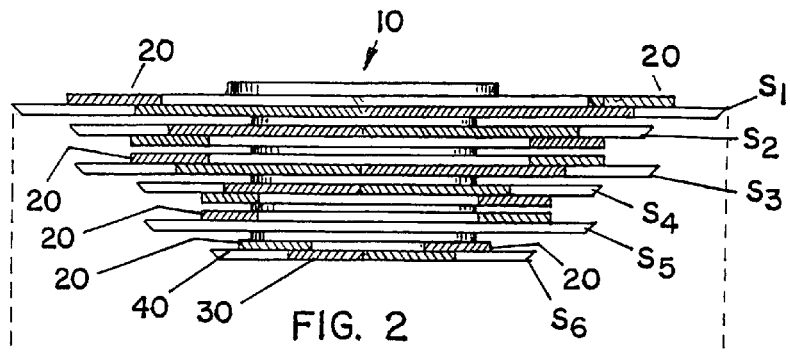
FIG. 2 is a top view of the cluster sprocket gear according to FIG. 1.
Figure 1:
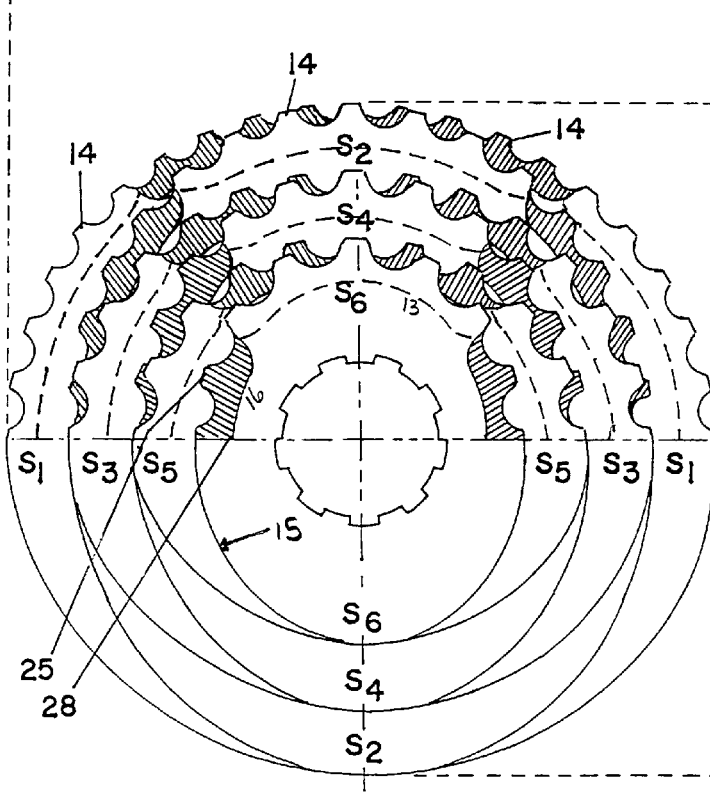
FIG. 1 shows a front view of the cluster sprocket gear of the invention.
Figure 3:
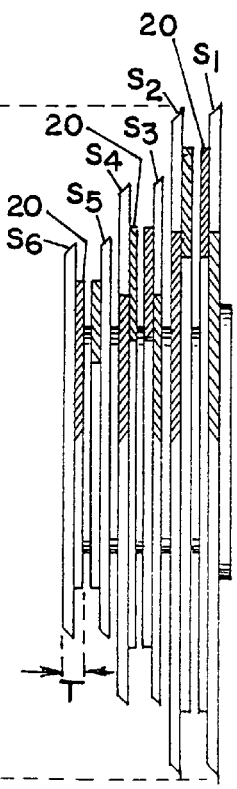
FIG. 3 is a front plan view thereof.

FIGS. 1–3 show the cluster sprocket gear 10 of the present invention. The cluster sprocket gear comprises a plurality of sprockets $S_{1-6}$ that are axially positioned on a wheel axis X so as to respectively be adjacently positioned. It shall be understood that the sprocket gear 10 of the invention may comprise a greater or lesser number of sprockets depending upon the desired transmission configuration (e.g., 18-speed or 21-speed) for the bicycle or other prime mover in which the sprocket gear is incorporated. Although not shown, it shall be understood that the sprocket gear 10 of the invention may be used in conjunction with a chain and a derailer gear (not shown), wherein the derailer serves to derail the chain entrained around one sprocket to an adjacent sprocket of the sprocket gear 10. Many types of derailers may be employed with the sprocket gear 10 of the invention without departing from the spirit and scope of this invention.

More particularly, each of the sprockets $S_{1-6}$, comprises in the first preferred embodiment of the present invention a non-circular configuration that includes at least one small radius and at least one long radius. There are two short radiuses forming a short diameter and two long radiuses forming a long diameter. The short and long radios are dimensioned such that a short radius of one sprocket is substantially equal in length or slightly appreciably shorter in length to a long radius of an adjacent sprocket. Further, in accordance with the principles of this invention, the individual sprockets $S_{1-6}$ are axially aligned on the axis X of the wheel to which the sprocket gear 10 is mounted, in a position such that the long radius of one sprocket is axially aligned or retarded relative to the short radius of an adjacent sprocket.

The sprockets according to the invention are substantially axially aligned adjacent to one another such that the short radius of one sprocket is axially substantially aligned with and substantially equal in length with the long radius of an adjacent sprocket. For example, in an oval configuration, the short diameter of an adjacent sprocket is axially substantially aligned with, and substantially equal in length with, the long diameter of an adjacent sprocket.

The alignment of the short radius of one sprocket with the long radius of an adjacent sprocket facilitates derailing of the chain from the one sprocket to the adjacent sprocket at the point where the respective short and long radiuses are substantially aligned and substantially equal in length with each other. The derailing is accomplished by virtue of the fact that the chain need not move radially outwardly or inwardly from the sprocket on which it is engaged to an adjacent sprocket as occurs in prior art sprocket gears wherein the sprockets are generally circular in configuration and comprise different diameters. As there is no need to move the chain radially outwardly or inwardly, during derailing, the chain is allowed to be easily moved to the adjacent sprocket at the point wherein the respective long and short diameters of adjacent sprockets are substantially equal.

FIG. 1 shows a sprocket gear 10 having six sprockets each of an eccentric oval configuration, the aforementioned relationship results in adjacent sprockets having diameters that are substantially equal in length in at least five positions. For example, as shown in FIG. 2, the short diameters $S_{2S}$ and $S_{4S}$ of sprockets $S_2$ and $S_4$ are substantially equal or slightly appreciably greater in length to the long diameters $S_{3L}$ and $S_{5L}$ of respective adjacent sprockets, $S_3$ and $S_5$, respectively.

Similarly, as shown in FIG. 3, the short diameters $S_{1S}$, $S_{3S}$ and $S_{5S}$ of sprockets $S_1$, $S_3$ and $S_5$ are substantially equal or slightly appreciably greater in length to the long diameters $S_{2L}$, $S_{4L}$ and $S_{6L}$ of sprockets $S_2$, $S_4$ and $S_6$, respectively.

The long radius of the sprockets may be retarded relative to the short radius of adjacent sprockets, preferably by about one tooth, and assures that the distance between respective disengaging and engaging teeth of the adjacent sprockets is equal to the pitch of the chain, thereby facilitating smoother chain derailing. Furthermore, it is noted that several of the teeth along the area of the adjacent equal-in-length diameters of the sprockets may be specially configured to be easily disengageble and engagable by the chain during derailing.

What differentiates the cluster sprocket of the present invention from the sprocket cluster of the prior art and especially to the sprocket disclosed in U.S. Pat. No. 6,293,884 to the same inventor is that the sprocket of the present invention is thicker than the prior art sprocket. In order words, the sprocket has a thickness T equal to two times a thickness of the gear teeth.

The thickness of the gear teeth is normally between 1 to 1.35 mm, thus the thickness T of the sprockets of the present invention is approximately 2–2.5 mm.

The sprocket of the present invention comprises:
a perimeter 15,
a front face 30, and
a back face 40,
wherein gear teeth 14 project axially from at least a first perimeter segment 13 of said front face 30 and wherein at least a second perimeter segment 16 of said front face 30 is free of gear teeth;
wherein gear teeth 14 project axially from said back face perimeter at the at least second segment 16 of the front face 30, and wherein no gear teeth project from the back face perimeter at the at least first perimeter segment 13 of the front face 30.

Having the sprockets approximately thicker than the gear teeth allows each sprocket to include chain-guiding recesses 20 in the surface of the gear teeth 14 without affecting the engagement of the chain.

The each chain-guiding recess 20 runs from the tip 25 of each tooth 14 to the base 28 of the tooth 14. In other words, each chain-guiding recess 20 runs through the entire depth of the tooth.

In order for the chain to engage the teeth, it is essential that the thickness of each chain-guiding recess 20 correspond to approximately the thickness of the gear teeth.

Each sprocket is designed in such a way that includes four chain-guiding recesses 20. Each chain-guiding recess comprises ¼ of the size of the sprocket. The chain-guiding recesses 20 are arranged on each sprocket in such a way that the chain-guiding recesses 20 are alternatively positioned in the front face 30 and back face 40 of each sprocket.

The chain-guiding recesses 20 in each one of the two long radiuses of each sprocket are located in the same face of the sprocket, while the chain-guiding recesses of the two short radiuses are located in the same face of the sprocket. In other words, if the chain-guiding recesses of the long radius are located in the front face 30 of the sprocket, the chain-guiding recesses in the short radius are located in the back face 40 of the sprocket.

The chain-guiding recesses 20 of the front face 30 of the sprocket are located at the second perimeter segment 16 of the front face 30 and wherein the chain-guiding recesses 20 of the back face 40 of the sprocket are located at the first perimeter segment 13 of the front face 30.

It is critical for the present invention that the chain-guiding recesses 20 of two adjacent sprockets slightly overlap in order to always keep the chain engage to the system.

The present invention further comprises a sprocket gear, comprising in combination:
at least two sprockets axially and concentrically positioned relative to one another;
said sprockets comprising a non-circular configuration having at least one long radius and at least one short radius; and
wherein the sprockets being axially aligned adjacent to one another such that said short radius of one said sprocket is axially substantially aligned with and substantially equal in length with said long radius of an adjacent sprocket;
wherein each sprocket comprises:
a perimeter,
a front face, and
a back face,
wherein gear teeth project axially from at least a first perimeter segment of said front face and wherein at least a second perimeter segment of said front face is free of gear teeth;
wherein gear teeth project axially from said back face perimeter at the at least first segment of the front face, and wherein no gear teeth project from the back face perimeter at the at least second perimeter segment of the front face.

Each sprocket of the sprocket gear has the same structure of the sprocket of the present invention.

Further, it is essential for the sprocket gear according to the present invention that the chain-guiding recesses of adjacent sprockets overlap in order to always keep the chain engaged to the system.

In the present invention, the sprockets $S_{1-6}$ are axially positioned on a wheel axis X so that the chain-guiding recesses of the long radius of the sprockets is retarded 90° relative to the chain-guiding recess of the long radius of adjacent sprockets. Thus, the sprocket is positioned in such a way that the chain-guiding recesses of the back face of one sprocket is facing the chain-guiding recess of the front face of the adjacent sprocket, and the non chain-guiding recess portion of the back face is facing the non chain-guiding recess portion of the front face of the adjacent sprocket.

The cluster sprocket gear according to the present invention allows the chain of shifting from one sprocket to the adjacent sprocket in a smooth manner thanks to the way the sprockets are assembled in the sprocket gear.

In the second preferably embodiment of the present invention, each sprocket of the sprocket gear comprises a circular configuration. A circular configuration can be used as long as the thickness of the sprocket is approximately twice the thickness of a traditional sprocket.

During operation, starting with a chain that is entrained around the first sprocket $S_1$, the derailer gear forcibly moves the chain sideways to be in alignment with the second sprocket $S_2$. The second sprocket $S_2$ engages the chain at the point as shown in FIG. 1 wherein the short diameter $S_{1S}$ of the first sprocket $S_1$ is substantially equal in length to the diameter $S_{2L}$ of the second sprocket $S_2$.

Likewise, derailing from the second to the third sprockets $S_2$–$S_3$, occurs at a point when the short radius $S_{2S}$ is aligned with the long diameter $S_{3L}$ at sprocket $S_3$. The respective alignments continue for the balance of the sprockets S for shifting into higher gears and in a reverse direction for shifting into lower gears.

The design of the sprocket gear of the present invention allows the system to change from low gear to a high gear and vice versa.

It should be appreciated that the sprocket gear of the invention facilitates the derailing of the chain from one sprocket to another without slippage, and is therefore particularly useful when incorporated into a multi-speed bicycle transmission. However, it should be understood that the sprocket gear 10 of the invention might be incorporated into transmissions for other machinery and prime movers without departing from the spirit and scope of this invention.

The present disclosure includes that contained in the appended claims, as well as that of the foregoing description. Although this invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention.

Now that the invention has been described,

What is claimed is:

1. A sprocket comprising:
   a perimeter,
   a front face, and
   a back face,
   wherein gear teeth project radially from at least a first perimeter segment of said front face and wherein at least a second perimeter segment of said front face is free of gear teeth; wherein gear teeth project radially from said back face perimeter at the at least second segment of the front face, and wherein no gear teeth project from the back face perimeter at the at least first perimeter segment of the front face; and
   wherein the sprocket is a non-circular sprocket having at least one long radius and at least one short radius.

2. A sprocket according to claim 1, wherein the thickness of the sprocket is between 2 to 2.5 mm.

3. A sprocket according to claim 1 further comprising chain-guiding recesses equally spaced apart on the sprocket.

4. A sprocket according to claim 3, wherein the chain-guiding recesses are alternatively positioned between the front and back face of the sprocket.

5. A sprocket according to claim 4, wherein the chain-guiding recesses of the front face of the sprocket arc located at the second perimeter segment of the front face and wherein the chain-guiding recesses of the back face of the sprocket are located at the first perimeter segment of the front face.

6. A sprocket according to claim 1, wherein the chain-guiding recess in the at least long radius of the sprocket are located in the same face of the sprocket, wherein the chain-guiding recess in the at least short radius of the sprocket are located in the same face of the sprocket.

7. A sprocket gear, comprising in combination:
   at least two sprockets radially and concentrically positioned relative to one another;
   said sprockets comprising a non-circular configuration having at least one long radius and at Least one short radius; and
   wherein the sprockets being axially aligned adjacent to one another such that said short radius of one said sprocket is axially substantially aligned with and substantially equal in length with said long radius of an adjacent sprocket;
   wherein each sprocket comprises:
   a perimeter,
   a front face, and
   a back face,
   wherein gear teeth project radially from at least a first perimeter segment of said front face and wherein at least a second perimeter segment of said front face is free of gear teeth;
   wherein gear teeth project radially from said back face perimeter at the at least first segment of the front face, and wherein no gear teeth project from the back face perimeter at the at least second perimeter segment of the front face.

8. A sprocket gear according to claim 7, wherein each sprocket has a thickness equal to two times the thickness of the gear teeth.

9. A sprocket gear according to claim 8, wherein the thickness of each sprocket is between 2 to 2.5 mm.

10. A sprocket gear according to claim 7, wherein each sprocket further comprises four chain-guiding recesses, equally spaced apart.

11. A sprocket gear according to claim 10, wherein the at least two sprockets are axially positioned on a wheel axis X so that the chain-guiding recess of the long radius of the sprockets is retarded 90° relative to the chain-guiding recess of the long radius of adjacent sprockets.

12. A sprocket gear according to claim 10, wherein the at least two sprockets are on a wheel axis X so that the chain-guiding recess of the back face of one sprocket is facing the chain-guiding recess of the front face of the adjacent sprocket, and a non chain-guiding recess portion of the back face is facing a non chain-guiding recess portion of the front face of the adjacent sprocket.

13. A sprocket gear according to claim 10, wherein the chain-guiding recesses on each sprocket are alternatively positioned between the front face and back face.

14. A sprocket gear according to claim 13, wherein the chain-guiding recesses of adjacent sprockets overlap in order to always keep the chain engaged to the system.

15. A sprocket gear according to claim 13, wherein the chain-guiding recesses of the front face of each sprocket are located at the second perimeter segment of the front face and wherein the chain-guiding recesses of the back face of each sprocket are located at the first perimeter segment of the front face.

16. A sprocket gear according to claim 7, wherein the chain-guiding recess in the at least long radius of each sprocket are located in the same face of the sprocket, wherein the chain-guiding recess in the at least short radius of each sprocket are located in the same face of the sprocket.

* * * * *